(12) United States Patent
Yao

(10) Patent No.: US 6,392,198 B1
(45) Date of Patent: May 21, 2002

(54) SEALING MACHINE OF CLIP TYPE

(76) Inventor: San-Ho Yao, No. 12, Zhu Zi Jiap, Quan Xing Li, Xin Hua Zhen, Tainan Hsien (TW)

( * ) Notice: Subject to any disclaimer, the term of this patent is extended or adjusted under 35 U.S.C. 154(b) by 0 days.

(21) Appl. No.: 09/903,555

(22) Filed: Jul. 13, 2001

(51) Int. Cl.[7] ........................... H05B 3/00; B32B 31/00; B30B 15/34
(52) U.S. Cl. ................... 219/243; 219/228; 156/583.9; 156/583.2; 156/579
(58) Field of Search ................................. 219/243, 228, 219/524; 156/583.9, 583.1, 583.2, 579, 515

(56) References Cited

U.S. PATENT DOCUMENTS

| | | | | |
|---|---|---|---|---|
| 2,535,171 A | * | 12/1950 | Sundstrom | 156/579 |
| 3,332,603 A | * | 7/1967 | Kamins et al. | 156/579 |
| 3,847,712 A | * | 11/1974 | Hubbard | 156/515 |
| 3,867,226 A | * | 2/1975 | Guido et al. | 156/229 |
| 5,307,257 A | * | 4/1994 | Fukushima | 363/53 |
| 5,352,323 A | * | 10/1994 | Chi | 156/583.9 |
| 6,246,027 B1 | * | 6/2001 | Griffiths | 219/222 |
| 6,335,515 B1 | * | 1/2002 | Chou et al. | 219/243 |

\* cited by examiner

*Primary Examiner*—John A. Jeffery
(74) *Attorney, Agent, or Firm*—Rosenberg, Klein & Lee

(57) ABSTRACT

A sealing machine is comprised of a trough, a press plate, a pressure device, a heater element and a circuit board, wherein, the heater element is in the trough, an extension on one side at the middle section of the trough to accommodate the circuit board, a pivot on top of the extension to connect a handle of the press plate, a stick made of silicon rubber beneath the press plate to contact the heater element in the trough, the pressure device between the trough and the press plate to always hold the press plate against the heater element, the heater element having a semi-circular cross section and connected vertically a cooling electrode at its end, and the circuit board connected to the heater element including at least a surge absorption capacitor, a tantalum capacitor, diodes, a gate transistor, and a transistor to introduce a lower voltage for the use of the heater element.

3 Claims, 5 Drawing Sheets

SEALING MACHINE OF CLIP TYPE

BACKGROUND OF THE INVENTION (a) Field of the Invention

The present invention relates to a sealing machine of clip type for plastic film products (e.g. a plastic bag), and more particularly to one in appearance similar to that of a stationary or laundry clip, allowing portable in use by omitting a transformer in circuit.

(b) Description of the Prior Art

For objects such as plastic materials, crops and even the edibles wrapped up or placed in plastic film or bag for storage, up-scaling industrial or commercial purpose thermal sealing machines have been available for years. However, those sealing machines, desktop or seat type, take larger space and provide less mobility, if any, preventing home application. However, clothes, edibles (e.g. home baked cookies), kitchen remains, or perishable refuses generated in our daily life, objects pending sorting for storage (e.g. stationary items, toys or umbrella) also significantly depend on the use of a thermal sealing machine. Pratically, no one would bother using a sealing machine for domestic purpose since the conventional sealing machine is not portable.

A conventional sealing machine used a flat band of NiCd resistance wire as heater conductor (approximately in 5 mm wide, and 0.1 mm thick) and its resistance is approximately 0.6Ω for a sealing machine with 200 mm long heater wire. If 15V/20 A power is used, a 300W, weighing 2 Kg transformer must be used to drop city power voltage (say 100V) to 15V. Saving said transformer, when the heater wire is connected to 100V source, approximately 170 A current will be conducted to immediately burn out the heater wire. To maintain the current at 20 A, the voltage must be dropped to 15V or having the heater wire extended for 1200 mm long.

As described above, the transformer is used for producing a drop. Accordingly, the comparatively heavy weight of the transformer and more sturdy structure required to support the thinner heater wire prevent the conventional sealing machine from being compact for hand-held operation, thus, from becoming one of the home electrical appliances.

Furthermore, should longer heater wire be used, the extra length of the heater wire must be wound back and forth for multiple rounds on non-process surface, resulting in overheated heater wire particularly at both ends of the section of the heater wire on the process surface. Besides, said both ends could easily melt though the plastic film or bag during the process of sealing, forming missealing or weak spot on the sealing. Finally, the winding of the heater wire is vulnerable to failure.

SUMMARY OF THE INVENTION

The primary purpose of the present invention is to provide a compact sealing machine of clip type allowing hand-held operation essentially comprised of a trough, a press plate, a pressure providing device, a heater element and a circuit board. To achieve the purpose, the heater element is provided inside the trough. A portion extending from one side of the trough is extended to accommodate said circuit board. A pivot provided on said extension to connect to the handle of said press plate. A silicon rubber stick provided beneath said press plate holds against said heater element in the trough when the press plate is pressed while the pressure device provided between said trough and press plate always holds against the heater element in the trough. The section of the heater element indicates semi-circular and is connected at its end to a cooling electrode. Said circuit board comprised of surge absorption capacitor, tantalum capacitor, diode, gate transistor, and transistor, as a minimum is connected to the heater element to introduce a drop for the use by the heater element.

DETAILED DESCRIPTION OF THE PREFERRED EMBODIMENTS

Figure 1:
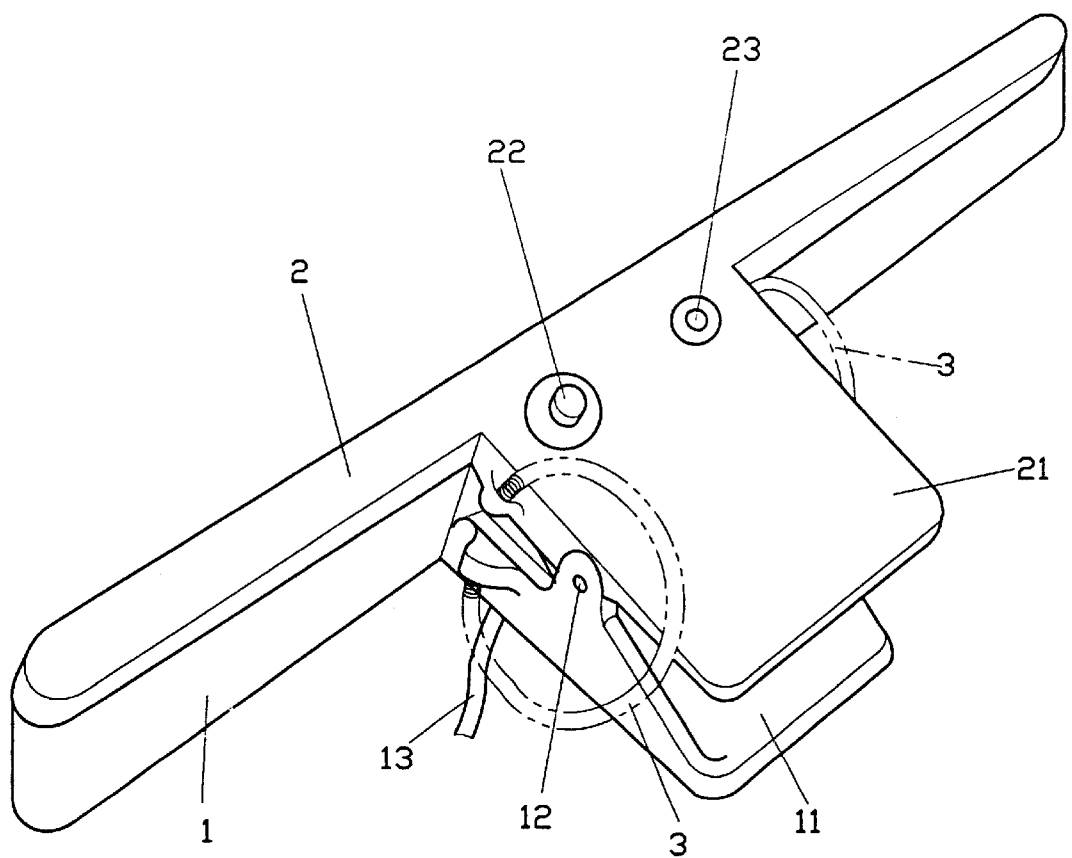
FIG. 1 is an elevation view of the present invention.

Referring to FIG. 1, a preferred embodiment of the present invention is comprised of a trough (1), a press plate (2), a pressure device (3), a heater element (4) and a circuit board (5) as illustrated in FIG. 6. Wherein, the heater element (4) is provided in said trough (1). An extension (11) is provided on one side at the middle section of the trough (1) to accommodate the circuit board (5) and a pivot (12) provided on the extension (11) to connect a handle (21) of the press plate (2) while a power cord (13) runs below the extension (11).

Figure 3:
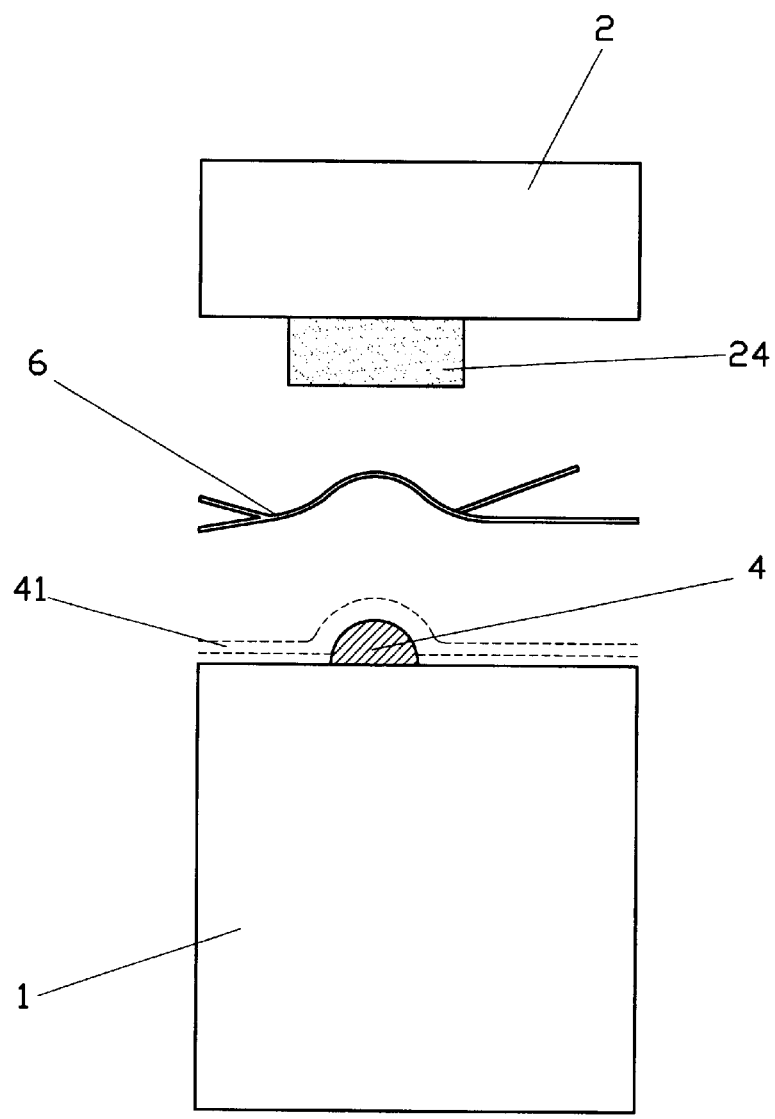
FIG. 3 is a cross view of a heater conductor of the preferred embodiment of the present invention.

The press plate (2) is in a long stick shape corresponding to the shape of the trough (1) and the handle (21) provided on one side at the middle of the press plate (2) corresponding to the extension (11) of the trough (1). A push-button switch (22) and an LED indicator (23) are provided on top of the handle (21). As illustrated in FIG. 3, a silicon rubber stick (24) presses against the heater element (4) in the trough (1).

The pressure device (3) is located between the trough (1) and the press plate (2) so that in normal status the press plate (2) presses against the heater element (4) in the trough (1). In FIG. 1, the press device (3) is comprised of two C-shape rings with both ends of an opening of each ring respectively holding against the extension (11) of the trough (1) and the handle (21) of the press plate (11), both on the same side of the pivot (12).

Figure 4:
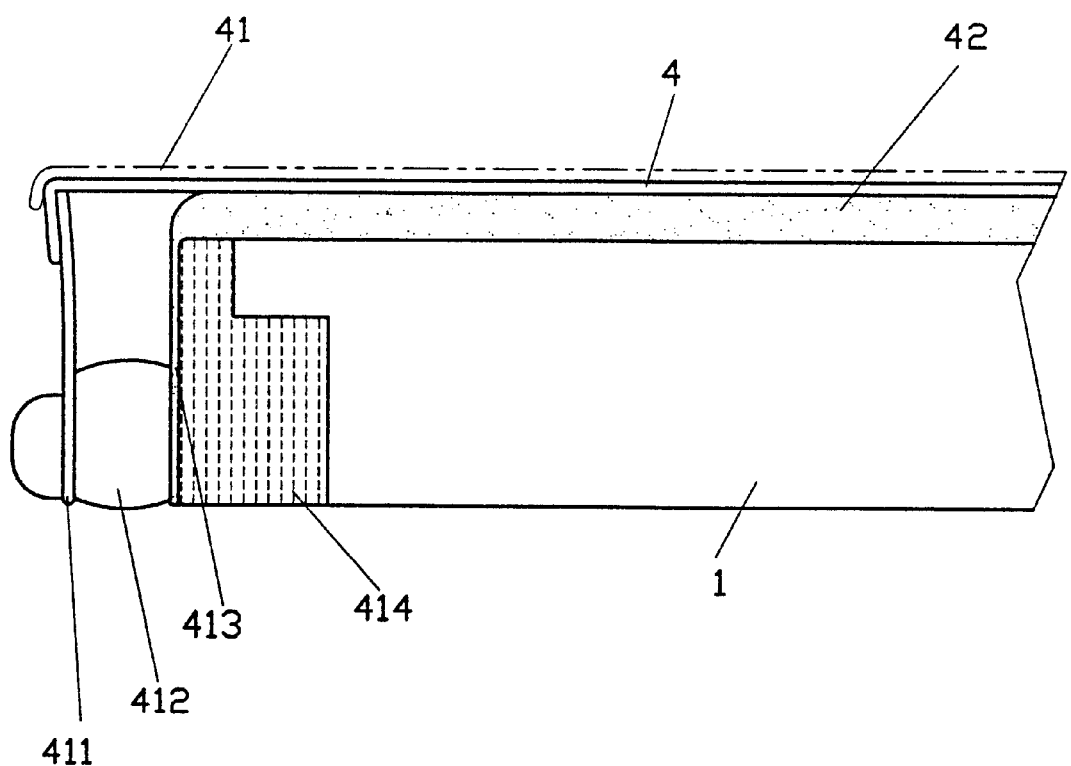
FIG. 4 is a sectional view at the heater end of the preferred embodiment of the prevent invention.

The heater element (4) is made of NiCd alloy in a construction as illustrated in FIG. 3. Wherein, the heater element (4) has a semi-circular cross section and an electric insulation layer (41) covered on its top. As illustrated in FIG. 4, a heat insulation layer (42) is provided beneath the heater element (4) and an electrode (411) is fixed vertically to the end of the heater element (4). The electrode (411) is connected to a cooling electrode (413) made of bronze through a connection block (412) made of a conductive material. The cooling electrode (413) is fixed to an electrode support (414) and the electrode support (414) in turn is fixed to the trough (1).

Figure 5:
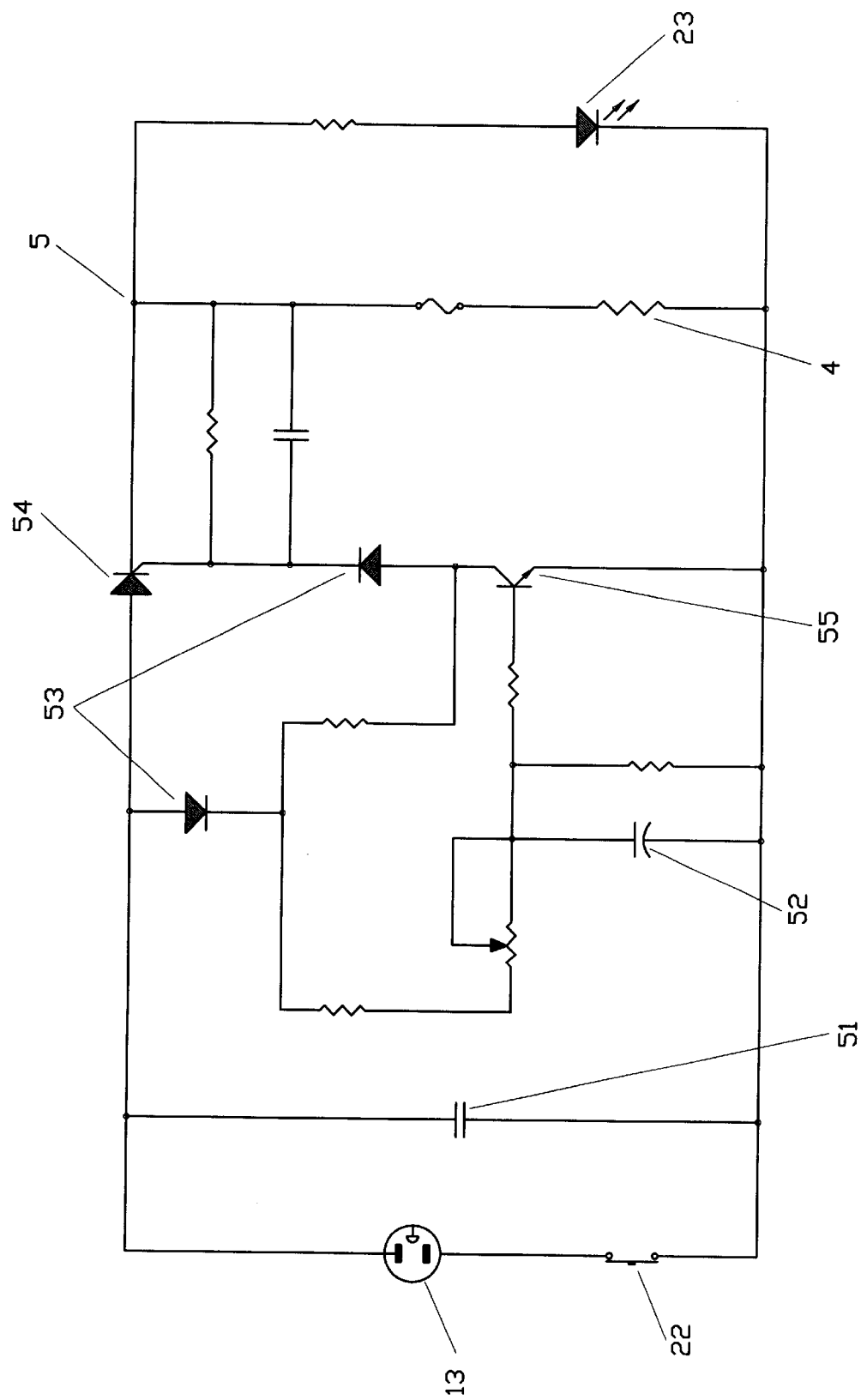
FIG. 5 is a wiring diagram of the preferred embodiment of the present invention.

The circuit board (5) is installed in the trough (1) with its circuit diagram as illustrated in FIG. 5. The circuit board (5) includes a surge absorption capacitor (51), a tantalum capacitor (52), diodes (53), a gate transistor (54), a transistor (55) and a plurality of resistances (not numbered), and is connected to the power cord (13), the switch (22), the indicator (23) and the heater element (4). Current with higher voltage (e.g. 100V) is introduced to the power cord (13) by the gate transistor (54) to supply a lower voltage (15V) for the use of the heater element (4).

Figure 2:
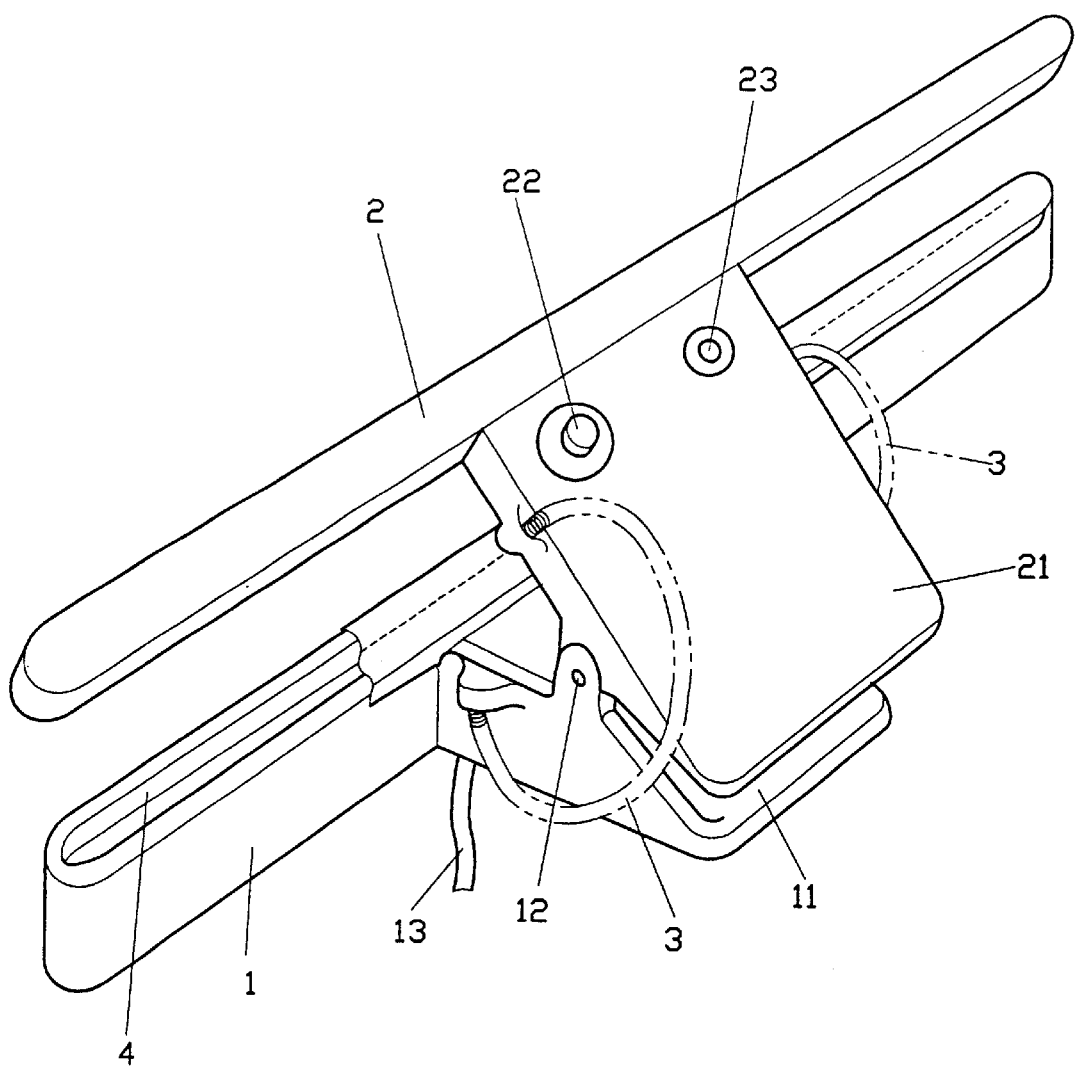
FIG. 2 is a schematic view showing a preferred embodiment of the present invention.

When in use as illustrated in FIG. 2, the handle (21) is pressed to clear the press plate (2) from the trough (1) and the silicon rubber stick (24) also clears away from the heater element (4), as shown in FIG. 3. Then the switch (22) is pressed for the circuit board (5) to execute time-controlled heating operation. The indicator (23) is turned on once upon completing the heating process. A plastic film (or bag) (6) is inserted between the trough (1) and the press plate (2). The handle (21) is released for the pressure device (3) to reset the press plate (2) and the silicon rubber stick (24) presses the plastic film (6) to attach to the heater element (4). As the silicon rubber stick (24) is flexible, it practically has the plastic film (6) to cover up the entire semi-circular section of the heater element (4) to provide fast and sufficient heating effects. Furthermore, the cooling electrode (413) of the heater element (4) prevents overheating to destroy the plastic film (6).

I claim:

1. A sealing machine of clip type comprised of a trough, a press plate, a pressure device, a heater element and a circuit board, wherein, said trough receiving the heater element therein and having an extension extended from one side at its middle section to accommodate said circuit board, and a pivot on said extension to connect a handle of said press plate;

said press plate in configuration corresponding to said trough having the handle provided on one side at its middle section in relation to and pivoted to said extension, and a silicon rubber stick beneath the press plate to hold against said heater element in said trough;

said pressure device being between said trough and said press plate to hold said press plate against said heater element in said trough in normal status;

said heater element having a semi-circular cross section and vertically connected to a cooling electrode at its end; and said circuit board including at least a surge absorption capacitor, a tantalum capacitor, diodes, a gate transistor, and a transistor, being connected to the heater element, thus, current with higher voltage being introduced to supply a lower voltage for the use of said heater element.

2. A sealing machine of clip type as claimed in claim 1, wherein, an electrode is vertically fixed to one end of said heater element, and connected to a cooling electrode by means of a connection block with said cooling electrode fixed to an electrode support which in turn fixed said trough.

3. A sealing machine of clip type as claimed in claim 1, wherein, said pressure device is comprised of two C-shape rings having both ends of an opening of each ring respectively holding against said extension of said trough and said handle of said press plate.

* * * * *